Feb. 4, 1964          H. R. SMITH          3,120,625
STATIC DISCHARGES FOR AIRCRAFT
Filed June 2, 1960

INVENTOR
Henry Roy Smith
By
Watson, Cole, Grindle & Watson
ATTORNEYS

United States Patent Office 3,120,625
Patented Feb. 4, 1964

3,120,625
STATIC DISCHARGES FOR AIRCRAFT
Henry Roy Smith, Marlow, England, assignor to Chelton (Electrostatics) Limited, Marlow, England, a British company
Filed June 2, 1960, Ser. No. 33,487
Claims priority, application Great Britain June 4, 1959
5 Claims. (Cl. 317—2)

This invention relates to static dischargers for aircraft that is to say to devices for dissipating electric charges which may build up on the aircraft during flight.

The usual form of static discharger employed at the present time is the type described in British patent specification No. 627,241 which comprises a number of silver impregnated cotton strands clamped at one end in an aluminum lug which is attached to the trailing edge of wings or other surfaces of the aircraft. The cotton strands are covered for the greater part of their length in a polyvinyl chloride tube but their outer ends, that is the ends remote from the lug, are left uncovered. The silver impregnation provides sufficient conductivity to enable static charges to pass down the strands and to be dissipated when the potential gradient at the free ends of the strands is sufficient to ionise the air at the fine discharge points provided by the silver impregnation. Such dischargers, however, require frequent regular maintenance as they have to be trimmed periodically to maintain them in efficient condition.

According to this invention, a static discharger for an aircraft comprises a length of multi-stranded metal wire with an insulating sheath, one end of the wire being secured to and in electrical contact with a metal tag for fixing to the aircraft structure and the other end of the wire protruding beyond the end of the sheath with strands terminating at different distances from the end of the sheath. This construction in which the free ends of the wire are cut to be of different lengths causes the end portion of the wire beyond the sheath to fluff out into a brush shape giving many different distinct discharge points. Very fine wire may be employed for the individual strands and conveniently nickel chromium wire of No. 51 S.W.G. (0.0007 inch diameter) may be employed. It is found that such wire will give a satisfactory and silent discharge with a discharger of a total length of the order of 6 inches. Only a few strands are necessary to provide sufficient electrical discharge but preferably at least between 50 and 100 strands are employed to give adequate mechanically strength. Using No. 51 S.W.G. strands, 100 strands may readily be arranged in a sheath of half a millimetre (0.02 inch) internal diameter.

The use of the sheath, which conveniently is a polythene tube, together with the cutting of the strands to different lengths, prevents the conductive strands from becoming knotted or twisted together due to turbulence in the slip stream of the aircraft. This form of static discharger has been found to have a much longer life and requires less maintenance than the silver impregnated cotton strand type described above and enables dischargers to be made having only a very small fraction of the size and weight of the types of discharger heretofore employed.

The aforementioned metal tag conveniently comprises a tubular metal element gripping the wire. At the tag end, the strands of the wire may be arranged to extend beyond the sheath and then folded back over the sheath, the sheath and the folded strands being gripped in the tubular metal element. Such a tubular element may conveniently be received and gripped by a socket adapted to be secured to the aircraft structure. The tubular element may be made non-straight and the socket straight sided so that the tubular element on insertion is scraped by the socket to ensure good electrical contact.

In an arrangement having a socket on the aircraft arranged to receive the tap of the static discharger, the socket and tag are preferably so arranged that the discharger has to be inserted into the socket from the front end thereof with said other end of the wire passing through the socket to trail therefrom, the socket being arranged to grip the tag as the latter is moved rearwardly into the socket. Stop means may be provided to prevent the tag passing through the socket. Such a construction provides a very convenient way of fitting the dischargers to the aircraft permitting them to be moved and replaced quickly without any damage to the surface of the aircraft.

The following is a desription of one embodiment of the invention, reference being made to the accompanying drawings in which.

Figure 1:
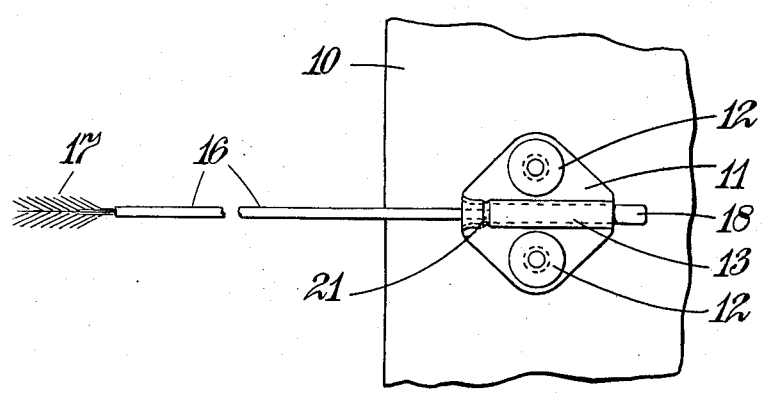
FIGURE 1 is a plan view of part of the surface of an aircraft with a socket and discharger attached thereto.
Figure 2:
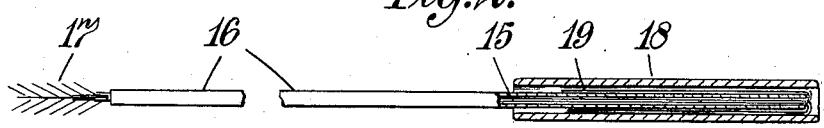
FIGURE 2 is a view on a larger scale of the discharger of FIGURE 1 partly in longitudinal section.
Figure 3:
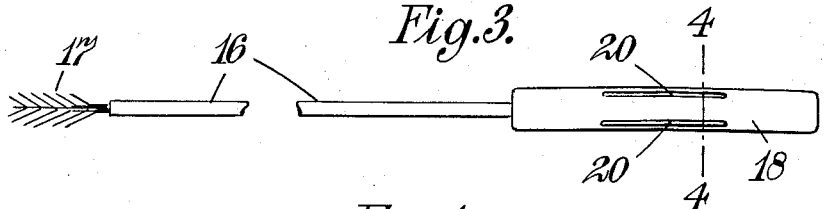
FIGURE 3 is a view in side elevation of the discharger of FIGURE 2.
Figure 4:
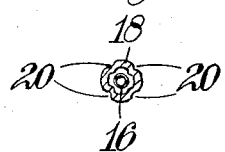
FIGURE 4 is a section along the line 4—4 of FIGURE 3 with the strands of wire omtted for clarity.
Figure 5:
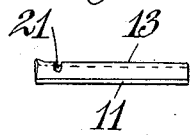
FIGURE 5 is a side elevation view of the socket of FIGURE 1.
Figure 6:
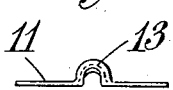
FIGURE 6 is an end elevation of the socket of FIGURE 1.

Referring to the drawings there is shown in FIGURE 1 a part 10 of the surface of an aircraft, for example a wing or tail surface. To this surface a socket member 11 is attached by means of two blind rivets 12. The socket member 11 is in the form of a flat plate formed to have a raised channel 13, the channel and the aircraft structure together forming a generally tubular socket to receive the discharger. The discharger comprises a stranded wire 15 formed of 100 strands of No. 51 S.W.G. nickel chromium wire within an insulating sheath 16 formed of polyvinyl chloride. At the free end the strands are cut off to different lengths to cause the end portion of the wire to fluff out into a brush shape as shown at 17. The end of the wire remote from the discharge end 17 is secured in an aluminum tubular element 18, the ends of the strands extending beyond the end of the sheath 16 and being bent over as shown at 19 to lie between the sheath and the tubular element 18 so that the latter is in electrical contact with the wire. The tubular element 18 is secured onto the wire by crimping in four places as indicated at 20 in FIGURES 3 and 4, the crimping being such as not to break the strands. As is most clearly seen in FIGURE 3 the tubular element 18 is bent slightly, for example to have a displacement at one end out of true of four thousandths of an inch for an element about ⅝ of an inch long. The discharger is inserted into the socket 11 by threading the wire from the brush end 17 through the socket until the tubular element 18 lies inside the socket. The slight bend in the tubular element 18 results in this element scraping along the socket to ensure good electrical contact. Should the discharger, on insertion, not fit tightly in the socket, it can be pulled out to about half the length of the tubular element 18 and slightly bent over until a good fit is obtained. An indent 21 is formed in the channel 13 in the socket to constitute a stop preventing further movement of the discharger through the socket. The air flow over the discharger will tend to pull it into the socket up to this stop and will thus tend to improve the electrical contact. The discharger however can readily be removed from the socket using a pair of pliers gripping the protruding end of the tubular element 18. After assembly the whole unit apart from the insulating sheath 16 and the discharger point 17 may be painted to give further resistance against corrosion.

It will be noted that the socket member 11 in conjunction with the surface of the aircraft structure constitutes the socket for the tubular element 18 and that the latter is forced into direct electrical contact with the aircraft structure.

I claim:

1. A static discharger for an aircraft comprising a length of multi-stranded metal wire having more than 40 strands and a diameter in the order of .02 inch with an insulating sheath supporting the strands to prevent knotting or twisting, one end of the wire being secured to and in electrical contact with a metal tag for fixing to the aircraft structure and the other end of the wire protruding beyond the end of the sheath with strands terminating at different distances from the end of the sheath.

2. A static discharger as claimed in claim 1 wherein, at the tag end, the strands of the wire extend beyond the sheath and are folded back over the sheath, the sheath with the folded over wires being gripped in the tubular metal element.

3. A static discharger as claimed in claim 1 in combination with a socket adapted to be secured to the aircraft structure, the socket being arranged to receive and grip said tubular metal element.

4. The combination claimed in claim 3 wherein said tubular element is made non-straight and said socket is straight sided so that the tubular element, on insertion, is scraped by the socket to ensure good electrical contact.

5. An aircraft having a socket arranged to receive the tag of a static discharger as claimed in claim 1, the socket and tag being arranged so that the discharger has to be inserted into the socket from the front end thereof with said other end of the wire passing through the socket to trail therefrom, the socket being arranged to grip the tag as the latter is moved rearwardly into the socket.

References Cited in the file of this patent
UNITED STATES PATENTS

| | | |
|---|---|---|
| 2,243,618 | Brown | May 27, 1941 |
| 2,536,818 | Lawton | Jan. 2, 1951 |
| 2,732,517 | Alabaster | Jan. 24, 1956 |